United States Patent
Adham et al.

(10) Patent No.: US 12,380,419 B2
(45) Date of Patent: Aug. 5, 2025

(54) SYSTEMS AND METHODS FOR COMPLIANCE AT TRANSACTION KIOSKS

(71) Applicant: BITACCESS INC., Ottawa (CA)

(72) Inventors: Mohammed Adham, Ottawa (CA); Nathaniel Wood, Ottawa (CA)

(73) Assignee: BITACCESS INC., Ottawa (CA)

( * ) Notice: Subject to any disclaimer, the term of this patent is extended or adjusted under 35 U.S.C. 154(b) by 0 days.

(21) Appl. No.: 17/715,653

(22) Filed: Apr. 7, 2022

(65) Prior Publication Data
US 2022/0335397 A1    Oct. 20, 2022

Related U.S. Application Data

(60) Provisional application No. 63/175,839, filed on Apr. 16, 2021.

(51) Int. Cl.
G06Q 20/18    (2012.01)
G06Q 20/06    (2012.01)
G06Q 20/40    (2012.01)

(52) U.S. Cl.
CPC .......... *G06Q 20/18* (2013.01); *G06Q 20/065* (2013.01); *G06Q 20/401* (2013.01); *G06Q 20/4015* (2020.05); *G06Q 2220/00* (2013.01)

(58) Field of Classification Search
CPC .... G06Q 20/18; G06Q 20/065; G06Q 20/401; G06Q 20/4015; G06Q 2220/00
See application file for complete search history.

(56) References Cited

U.S. PATENT DOCUMENTS

| | | | | |
|---|---|---|---|---|
| 9,652,772 | B1* | 5/2017 | Eyges | G06Q 20/4016 |
| 11,334,883 | B1* | 5/2022 | Auerbach | G06Q 20/223 |
| 2012/0018510 | A1* | 1/2012 | Gardner | G06Q 20/18 |
| | | | | 235/379 |
| 2013/0024300 | A1* | 1/2013 | Choudhuri | G06Q 30/018 |
| | | | | 705/16 |
| 2014/0279534 | A1* | 9/2014 | Miles | G06Q 20/4016 |
| | | | | 705/44 |

(Continued)

OTHER PUBLICATIONS

Ekizoglu et al., Fuzzy Rule-Based Analysis of Spatio-Temporal ATM Usage Data for Fraud Detection and Prevention, 2015, IEEE 2015 12th International Conferences on FSKD, pp. 1009-1014 (Year: 2015).*

*Primary Examiner* — John W Hayes
*Assistant Examiner* — Yingying Zhou
(74) *Attorney, Agent, or Firm* — Perry + Currier

(57) ABSTRACT

The systems and methods described herein provide a compliance determination for a customer at a transaction kiosk. First, the system provides, for display at a network-enabled transaction kiosk, a transaction interface for a user. The system selects or receives an approved transaction level for the user, with the transaction level including a transaction limit and one or more required datapoints for compliance of the transaction level. The system then detects a transaction attempt of the user which exceeds the transaction limit of the transaction level for the user, then determines a location of the user and a financial institution associated with the transaction kiosk. The system sends a prompt to the user at the transaction interface to provide one or more required datapoints for a higher transaction level. The system then receives the one or required datapoints, and associates the user with the higher transaction level.

19 Claims, 15 Drawing Sheets

(56) References Cited

U.S. PATENT DOCUMENTS

| | | | |
|---|---|---|---|
| 2017/0316357 A1* | 11/2017 | Meganathan | H04L 67/52 |
| 2018/0165655 A1 | 6/2018 | Marcelle et al. | |
| 2018/0240107 A1* | 8/2018 | Andrade | G06Q 20/36 |
| 2019/0188652 A1* | 6/2019 | Hunter | G06Q 20/4016 |
| 2019/0306137 A1 | 10/2019 | Isaacson et al. | |
| 2019/0356641 A1 | 11/2019 | Isaacson et al. | |
| 2020/0118127 A1 | 4/2020 | Miller | |
| 2020/0372533 A1 | 11/2020 | Rammal | |
| 2020/0410583 A1* | 12/2020 | Hart | G06Q 40/02 |
| 2022/0057918 A1* | 2/2022 | Rose | G06Q 20/4016 |

* cited by examiner

BTM

Please select the level you require

Each level requires specific documents or information

Up to 1,000 USD per day
(ID Documents)

Up to 10,000 USD per day
(Address, Occupation, SSN, ID
Documents, Manual Review)

Up to 2,000 USD per day
(Address, ID Documents)

Up to 5,000 USD per day
(Address, Occupation, ID
Documents)

Cancel

BTM

Enter your SSN

Please enter your social security number for verification. This is a legal requirement to transact above certain limits. Extra care is taken with the data security of this information, and it will remain secure.

Please take care to ensure the address registered to your SSN matches the address you submitted.

| 1 | 2 | 3 |
| 4 | 5 | 6 |
| 7 | 8 | 9 |
| - | 0 | ⟨x| | Proceed ⊙ |

Cancel

Figure 3D

| | |
|---|---|
| Telesign_VOIP | 0 |
| Telesign_PREPAID | 1 - cannot be determined with Twilio |
| Telesign_MOBILE | 2 |
| Telesign_NAME | 3 |
| Telesign_ADDRESS | 4 - cannot be determined with Twilio |
| Provided_name | 5 |
| Provided_address | 6 |
| ID_SCAN_1 | 7 |
| FACE_MATCH_1 | 8 |
| ID_SCAN_2 | 9 |

| | |
|---|---|
| SSN_Provided | 11 |
| Checkr_Background | 12 |
| Sanctions_Screening | 13 |

SYSTEMS AND METHODS FOR COMPLIANCE AT TRANSACTION KIOSKS

CROSS-REFERENCE TO RELATED APPLICATIONS

This application claims the benefit of U.S. 63/175,839, filed Apr. 16, 2021, which is incorporated herein by reference.

FIELD OF THE DISCLOSURE

The present disclosure relates generally to transaction kiosks and cryptocurrencies.

BACKGROUND

Cryptocurrency transaction kiosks, such as Bitcoin Teller Machines ("BTMs"), have been rising in popularity in recent years. Such transaction kiosks are located somewhere physical in the world and contain at least a screen interface, a network-enabled computer, and a cash device. Cryptocurrency transaction kiosks differ from other transaction kiosks, such as Automated Teller Machines (ATMs), in that they enable a user of the kiosk to purchase an amount in a cryptocurrency, e.g., Bitcoin, Ethereum, or any other cryptocurrency. In this instance, a typical interaction may involve the user showing up physically to the kiosk, scanning a QR code or other identifier containing a blockchain address for cryptocurrency, and selecting an option to deliver money to the blockchain address. The value amount is then exchanged into an equivalent amount in cryptocurrency.

SUMMARY

The invention overcomes problems of conventional systems by providing a compliance determination for a customer at a transaction kiosk. First, the system provides, for display at a network-enabled transaction kiosk, a transaction interface for a user. The system selects or receives an approved transaction level for the user, with the transaction level including a transaction limit and one or more required datapoints for compliance of the transaction level. The system then detects a transaction attempt of the user which exceeds the transaction limit of the transaction level for the user, then determines a location of the user and a financial institution associated with the transaction kiosk. The system sends a prompt to the user at the transaction interface to provide one or more required datapoints for a higher transaction level based at least on the location of the user, the financial transaction associated with the transaction kiosk, and the amount of the transaction attempt. The system then receives the one or required datapoints, and associates the user with the higher transaction level.

According to some embodiments, the transaction level for the user is selected based on user information which is at least partly determined from one or more datapoints associated with the user. In some embodiments, the transaction kiosk is configured to facilitate cryptocurrency transactions for users.

According to some embodiments, the prompt is sent to a client device associated with the user, with the one or more required datapoints being received from the client device at a later time than the session with the transaction kiosk. The system sends a notification to the client device that the user has been approved for the higher transaction level.

According to some embodiments, the system determines one or more compliance policies based at least the location and the financial institution associated with the kiosk, with the higher transaction level being determined based on at least the one or more determined compliance policies.

According to some embodiments, the system stores the one or more received datapoints from the user as bits in a bitmask associated with the user, with the bits of the bitmask all relating to collected datapoints on the user, and with the higher transaction level being determined based on one or more AND or OR operations on the bitmask associated with the customer.

According to some embodiments, at least one of the required datapoints is a set of cryptocurrency addresses the customer has submitted at the kiosk during a transaction attempt. The system generates a compliance message which satisfies the regulatory requirements of one or more compliance policies applicable to the location. In some embodiments, the system further broadcasts the compliance message to a blockchain network, with the blockchain network being configured to communicate compliance messages between financial institutions.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 3A is a figure illustrating an example of a user interface prompting a user to select a compliance level, in accordance with some embodiments.

FIG. 3C is a figure illustrating an example of a user interface prompting a user to enter an occupation, in accordance with some embodiments.

FIG. 3D is a figure illustrating an example of a user interface prompting a user to enter a social security number, in accordance with some embodiments.

FIG. 5A is a figure illustrating an example of proposed bitmask flags for a compliance system, in accordance with some embodiments.

FIG. 5B is a figure illustrating an example of a financial institution creating a compliance level within a compliance system, in accordance with some embodiments.

FIG. 5C is a figure illustrating an example of compliance levels within a compliance system, in accordance with some embodiments.

FIG. 5D is a figure illustrating an example of a user profile within a compliance system, in accordance with some embodiments.

DETAILED DESCRIPTION

Figure 1A:
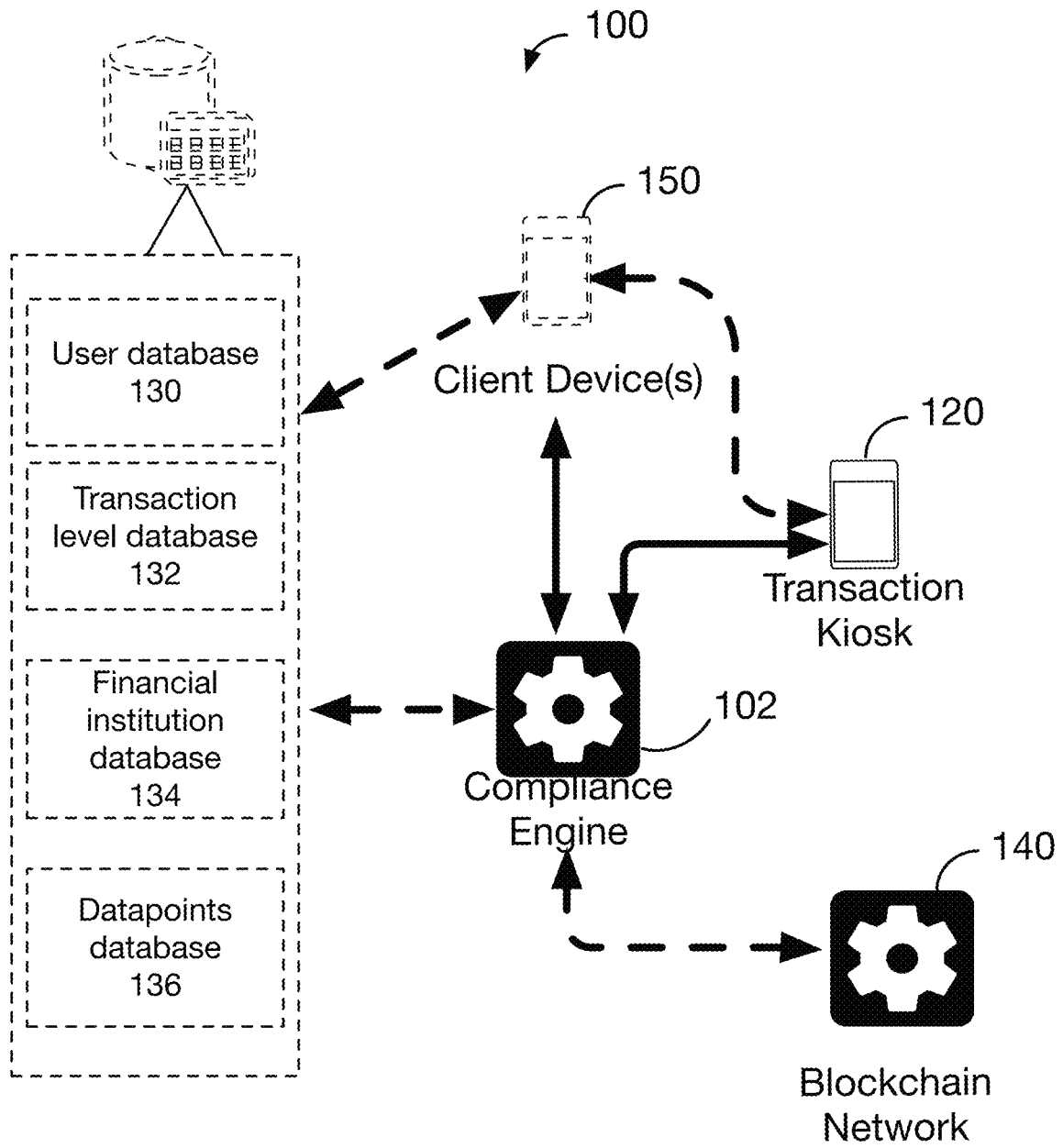
FIG. 1A is a diagram illustrating an exemplary environment in which some embodiments may operate.

In order to fulfill its function, a cryptocurrency transaction kiosk may be required to perform tasks relating to Know Your Customer ("KYC") compliance, among others.

One major difference between a cryptocurrency transaction kiosk and typical ATMs is that when a user arrives at a cryptocurrency transaction kiosk, the user is often not already a customer of the relevant financial institution, whereas with an ATM, a user arrives to the kiosk location with a debit card from a financial institution where the user is already a customer. Thus, no onboarding happens at the machine because the user has already been onboarded as a customer. In the case of a cryptocurrency transaction kiosk, the operator of the kiosk is a financial institution, and the customer onboarding can happen partially or entirely at the kiosk.

This necessity to onboard new customers at the kiosk leads to a new set of challenges. First, the customer should be onboarded based on a financial institution's compliance policy in accordance with local regulations. Such local regulations can vary considerably based on location (e.g., country) and jurisdiction (e.g., state). Second, the user experience provided to the customer upon arrival at the cryptocurrency transaction kiosk will change drastically based on location, jurisdiction, and the entity operating the kiosk. Different operators will often have slightly different compliance procedures, which leads to the amount of information the operator collects varying, and also leads to the time window for collection varying. Extensively supporting such permutations within a cryptocurrency transaction kiosk is a non-trivial task.

Additionally, there is a need to onboard customers seamlessly at such a kiosk in a rapid fashion, without overly burdening the onboarding process. Some solutions involve requesting all potentially needed compliance information from all customers. For example, if any state requires a social security number verification and some other proof of address, a system may be designed to prompt all customers for these pieces of information, such that the system is compliant everywhere even if some local jurisdictions do not require it and even if the transaction level of the customer does not require it. This technically complies with all possible regulations, but is very cumbersome.

Thus, there is a need in the field of financial transactions to create new and useful systems and methods for providing a compliance system for transaction kiosks which is capable of contextually prompting the user for only the compliance information which is required for the transaction that user is hoping to execute. The source of the problem, as discovered by the inventors, is a lack of extensible compliance system that allows for separation of customers into transaction groups based on datapoints already present for them.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a transaction kiosk 120 is connected to a compliance engine 102. The compliance engine 102 is optionally connected to a blockchain network 140 for the purposes of initiating blockchain-based payments in the blockchain network 140, and optionally connected to one or more database(s), including a user database 130, transaction level database 132, financial institution database 134, and/or datapoints database 136. One or more of the databases may be combined or split into multiple databases. One or more client device(s) 150 are additionally connected to the compliance engine 102 and, optionally, the transaction kiosk 120 and/or the database(s). The compliance engine and/or transaction kiosk in this environment may be computer devices or hosted on computer devices.

The exemplary environment 100 is illustrated with only one transaction kiosk, one blockchain network, one compliance engine, and one client device for simplicity, though in practice there may be more or fewer instances of each. In some embodiments, one or more of these components may be part of or hosted on the same computer or device.

In one embodiment, the compliance engine 102 may perform the method 200 (FIG. 2A) or other method herein and, as a result, provide a compliance determination for a customer at a transaction kiosk. In some embodiments, this may be accomplished via communication with the transaction kiosk(s), blockchain network(s), client device(s), or other components of the system over a network. In some embodiments, the compliance engine 102 is an application hosted on a computer or similar device, or is itself a computer or similar device configured to host an application to perform some of the methods and embodiments herein.

Transaction kiosk 120 (hereinafter "kiosk") is a device which physically exists in some public space to provide a user interface by which a user of the kiosk can perform payment-related transactions. The kiosk is configured to display information in a user interface and allow for entering, generating, sending, and receiving information. In some embodiments, the transaction kiosk 120 is network- and/or cloud-enabled, allowing for connection and transfer of information to and from network-based payment applications, cloud-based applications or storage, blockchain addresses and blockchain networks, and more. In some embodiments, one or more transaction kiosks 120 may be associated with a service provider, user(s), kiosk provider (i.e., a financial institution or other financial entity which owns and/or maintains the kiosk in the physical space), or other entities. In some embodiments, transaction kiosk 120 is a computing device capable of hosting and executing one or more applications or other programs capable of sending and/or receiving information. In some embodiments, the transaction kiosk 120 is a BTM or other Automated Teller Machine (ATM), or otherwise may be a computer desktop or laptop, mobile phone, or any other suitable device capable of sending and receiving information. In some embodiments, the compliance engine 102 may be hosted in whole or in part as an application executed on the transaction kiosk 120.

In some embodiments, the transaction kiosk 120 contains local application software, which includes business logic and user interface functions. In some embodiments, the vast majority of the kiosk functionality is contained in this local application software. This software can also be updated automatically and frequently, and changes are visible in real-time across the kiosk network.

Figure 4A:
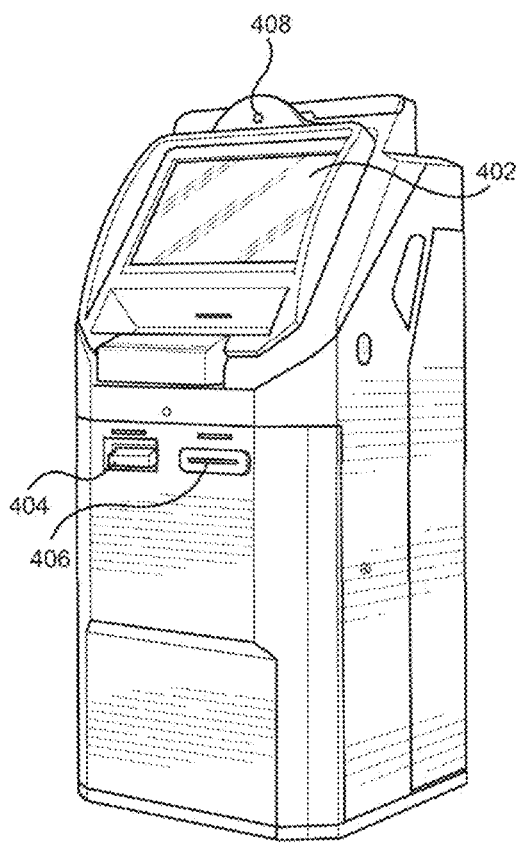
FIG. 4A is a figure illustrating an example of an angled front view of a transaction kiosk, in accordance with some embodiments.
Figure 4B:
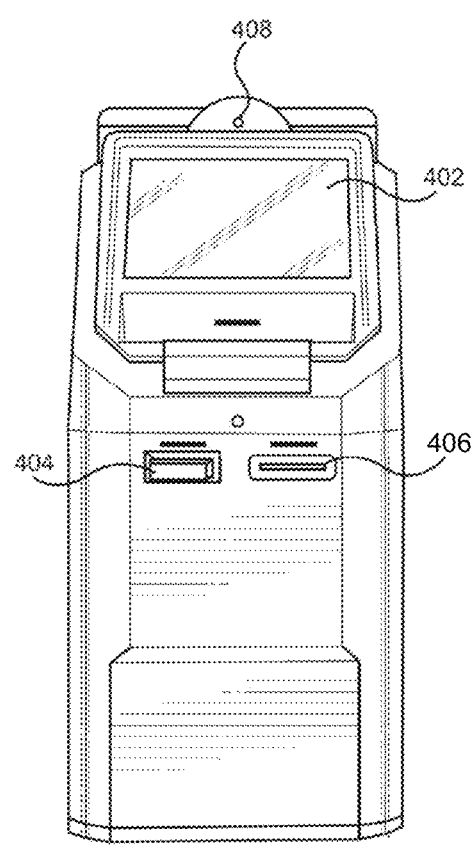
FIG. 4B is a figure illustrating an example of a front view of a transaction kiosk, in accordance with some embodiments.
Figure 4C:
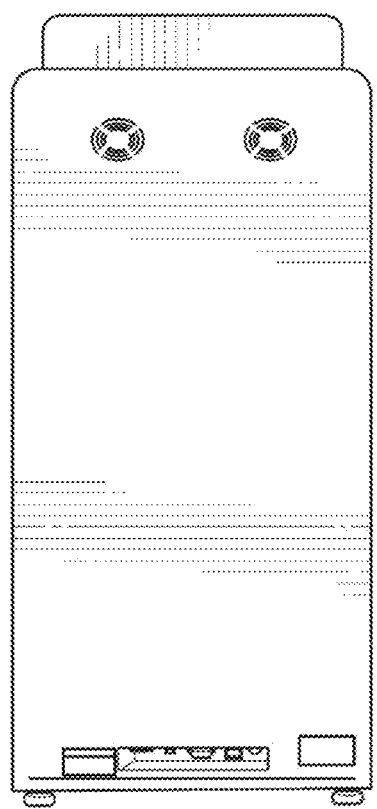
FIG. 4C is a figure illustrating an example of a back view of a transaction kiosk, in accordance with some embodiments.
Figure 4D:
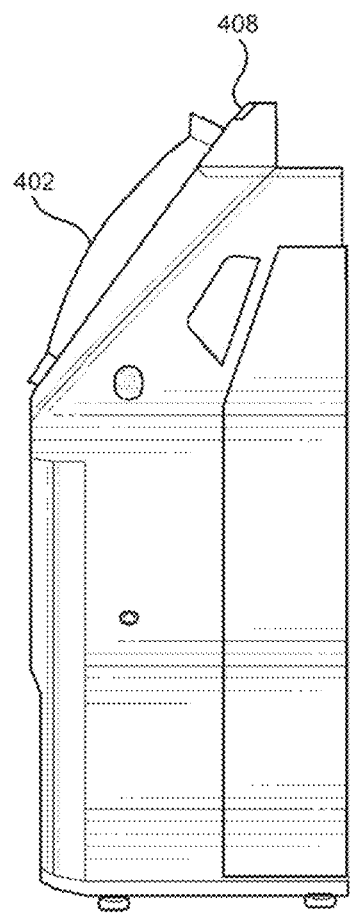
FIG. 4D is a figure illustrating an example of a right side view of a transaction kiosk, in accordance with some embodiments.

FIGS. 4A-4D are figures illustrating one example of a transaction kiosk at various angles, in accordance with some embodiments. Features which are present in the illustrated transaction kiosk include a touchscreen display 402 providing for a user interface that a user can interact with; a dispensing area 404 for dispensing currency for a recipient to physically collect at the kiosk; a depositing area 406 for a user to deposit fiat currency (e.g., government-issued banknotes, etc.); and a camera 408 for user identification, authentication, and security purposes. FIG. 4A is a figure illustrating an example of an angled front view of a transaction kiosk, in accordance with some embodiments. FIG. 4B is a figure illustrating an example of a front view of a transaction kiosk, in accordance with some embodiments. FIG. 4C is a figure illustrating an example of a back view of a transaction kiosk, in accordance with some embodiments. FIG. 4D is a figure illustrating an example of a right side view of a transaction kiosk, in accordance with some embodiments.

Returning to FIG. 1A, optional database(s) 130 including one or more of a user database 130, payment database 132, service provider database 134, and conversion database 136 function to store and/or maintain, respectively, user information, payments and payment requests, service provider information, and cryptocurrency and fiat currency exchange data. The optional database(s) may also store and/or maintain any other suitable information for the compliance engine 102 to perform elements of the methods and systems herein. In some embodiments, the optional database(s) can be queried by one or more components of system 100 (e.g., by the compliance engine 102), and specific stored data in the database(s) can be retrieved. In some embodiments, some or all elements of database(s) 130 will reside on private servers.

Blockchain network 140 is a distributed digital ledger of data that is shared among a network of independent parties. When a user or entity within the blockchain network wants to add a record, or "transaction", to a blockchain, users and entities in the blockchain with validation control verify the proposed transaction. In this fashion, blockchains are peer-to-peer systems wherein data integrity is maintained through a large distributed network. Components within a given blockchain include a block, or list of transactions recorded into a ledger over a given period; a chain, or hash that links one block to another; and a network composed of full nodes, with each node containing a complete record of all the transactions recorded within the blockchain. These transactions can record not only the details of any exchanged value but also any associated data payload linked to the transactions.

Optional client device(s) 150 are devices with a display configured to present information to a user of the device and send or receive data on behalf of the user of the device. In some embodiments, the user of the kiosk is the user of the client device 150. In some embodiments, the client device 150 presents information in the form of a user interface (UI) with UI elements or components. In some embodiments, the client device 150 sends and receives signals and/or information to the compliance engine 102 and/or the transaction kiosk 120. In some embodiments, the client device 150 is a computing device capable of hosting and executing one or more applications or other programs capable of sending and/or receiving information. In some embodiments, the client device 150 may be a computer desktop or laptop, mobile phone, virtual assistant, virtual reality or augmented reality device, wearable, or any other suitable device capable of sending and receiving information.

Figure 1B:
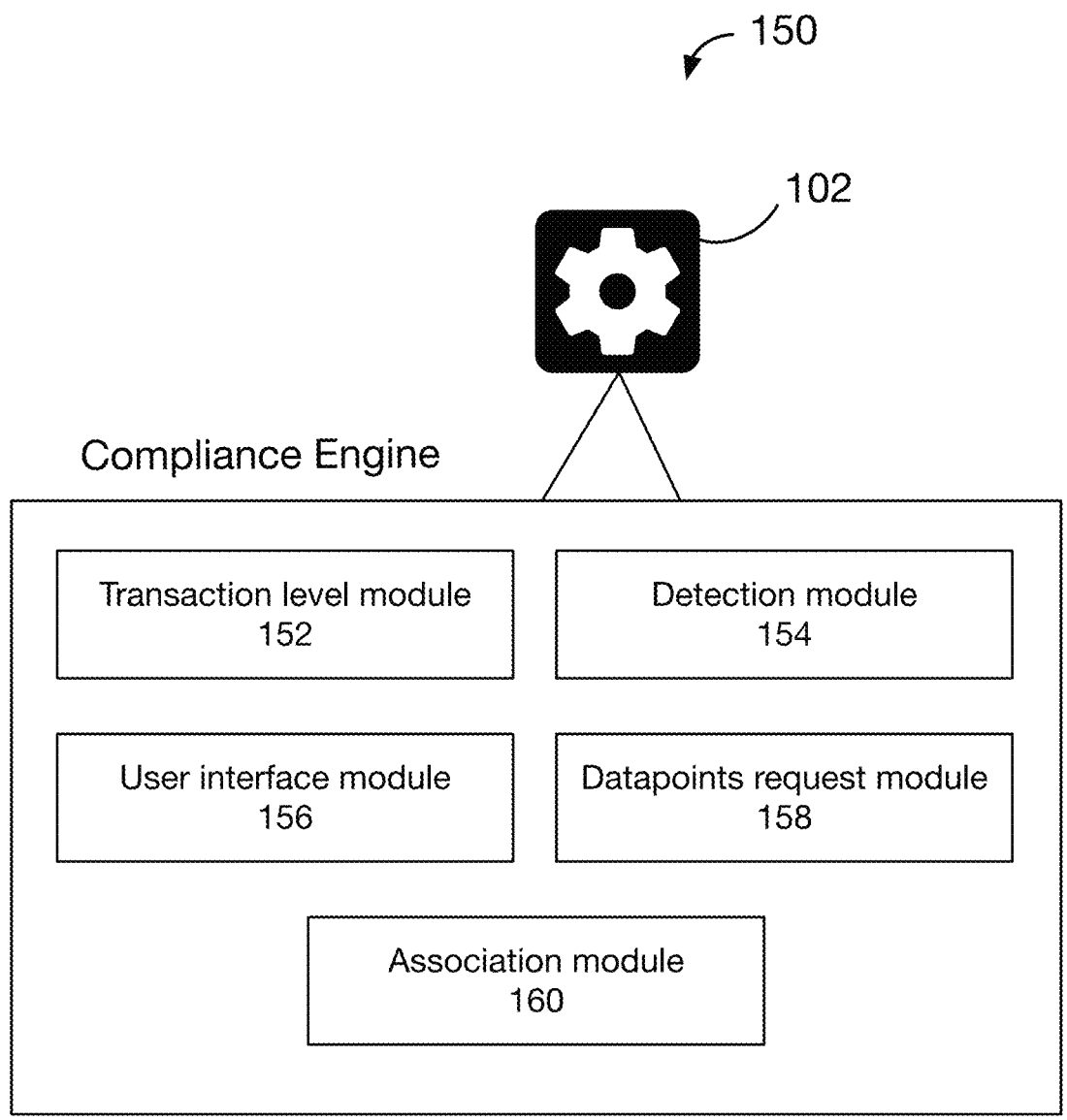
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Transaction level module 152 functions to select or receive an approved transaction level for the user, with the transaction level including a transaction limit and one or more required datapoints for compliance of the transaction level.

Detection module 154 functions to detect a transaction attempt of the user which exceeds the transaction limit of the transaction level for the user, and then determine a location of the user and financial institution associated with the transaction kiosk.

User interface module 156 functions to present a user interface to a user of the transaction kiosk, including compliance interactions and custom interfaces defined by service providers.

Datapoints request module 158 functions to send a prompt to the user at the transaction interface to provide one or more required datapoints for a higher transaction level based at least on the location of the user, the financial institution associated with the transaction kiosk, and the amount of the transaction attempt.

Association module 160 functions to receive the one or more required datapoints, and associate the user with the higher transaction level.

The above modules and their functions will be described in further detail in relation to an exemplary method below.

Various aspects of this exemplary embodiment will be described in further detail in relation to an exemplary method below.

II. Exemplary Method

Figure 2A:
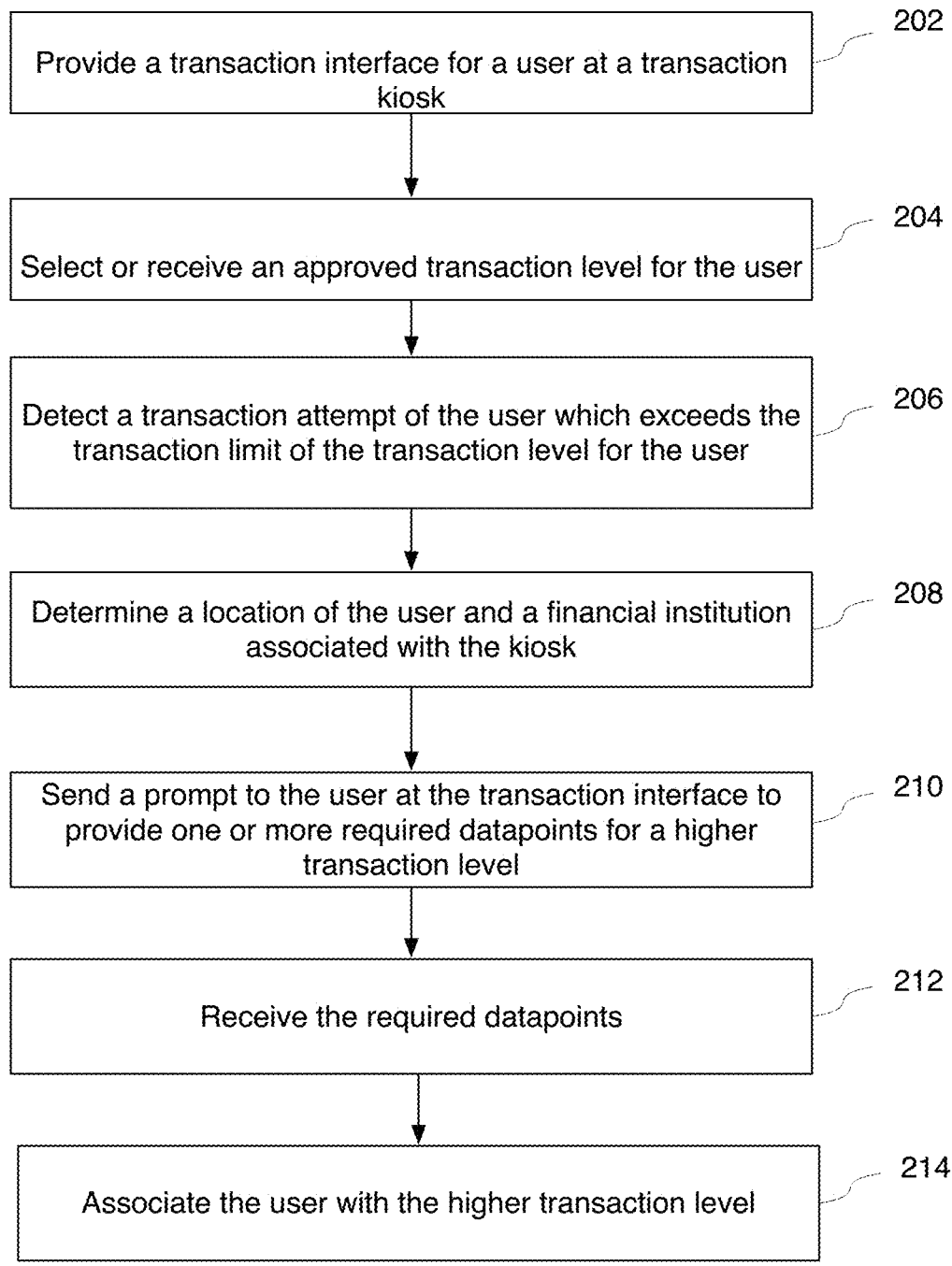
FIG. 2A is a flow chart illustrating an exemplary method that may be performed in some embodiments.

FIG. 2A is a flow chart illustrating an exemplary method that may be performed in some embodiments.

At step 202, the system provides a transaction interface for a user at a transaction kiosk. In some embodiments, the transaction interface is displayed at the transaction kiosk, and the kiosk is network-enabled to allow for network-based loading of the transaction interface in real time or substantially real time upon the user authenticating, signing on, or otherwise identifying himself at the kiosk. In some embodiments, the transaction kiosk is configured to facilitate cryptocurrency transactions for users.

In some embodiments, the system identifies a user interface scheme associated with the user. In some embodiments, the system updates the user interface based on the user of the kiosk being associated with (and authenticated within) the service provider, i.e., the financial institution providing services at the transaction kiosk.

The transaction interface is a user interface which appears on the display of the transaction kiosk. In some embodiments, the user interface displays components which can viewed and potentially interacted with. For example, the user interface may include components which can be interacted with via touch input on a touch screen.

A service provider can define what the user interface of a kiosk should look like for that service provider's customers. In effect, this may allow a service provider to have an ATM or BTM network as large as one which a big bank may have.

In some embodiments, the system updates the user interface for display at the transaction kiosk to match the user interface scheme. The user interface is updated to the service provider's specifications, as defined via the interface API within the compliance engine. From the perspective of the user or end customer, they appear to be using a kiosk provided by the service provider. For example, a PayPal or Square logo and branding may appear prominently, or particular distinctive colors or fonts may be associated with the company.

In some embodiments, the system additionally or alternately provides an authentication interface at a transaction kiosk. In some embodiments, an authentication interface may be a user interface configured to request some information from a user in order for an authentication procedure to occur. In some embodiments, the user is requested by the authentication interface to enter a unique identifier, such as an RFID card, a phone number, credit card, or any other form of identifying the user within the system. In some embodiments, a user PIN or password may additionally or alternatively be requested. The system may then authenticate or "onboard" the user at the transaction kiosk. In some embodiments, authentication may involve Know Your Customer ("KYC"), Anti-Money Laundering ("AML"), or other compliance-related procedures. In some embodiments, authentication may involve secure sign-on or verification procedures. A user may be verified within the compliance engine, transaction kiosk, payment application associated with a financial institution or other service provider, or any other suitable component of the system.

At step 204, the system selects or receives an approved transaction level for the user. In some embodiments, the transaction level includes a transaction limit and one or more required datapoints for compliance of the transaction level. In some embodiments, a transaction level for a user is received from an existing database, such as the transaction level database 132 or the user database 130. In some embodiments, the system may determine that the user is an existing user rather than a user needed to be newly onboarded within the system, and may retrieve an already-established transaction level for that user.

In some embodiments, the system selects an approved transaction level for the user from a predetermined list of transaction levels. In some embodiments, this selection occurs if a user is to be newly onboarded, i.e., does not yet exist within the system or within the service provider's user database. In some embodiments, a default transaction level may be automatically assigned to the user, such as transaction level 1, i.e., the transaction level with the lowest number of required datapoints. In some embodiments, some form of logic is utilized to determine which transaction level is to be assigned to the user. A wide variety of possibilities can be contemplated for such logical assignments.

In some embodiments, the system can select an approved transaction level for the user based on one or more existing datapoints already associated with the user. For example, if the user's full legal name and phone number are already known datapoints within the system, then the system may determine that the user qualifies for a first transaction level. If the social security number of the user is also already a datapoint, then the user may qualify for a second transaction level. If the user's address is already a datapoint, then the user may qualify for a third transaction level, and so on. Limits are enforced on each level, so users are prohibited from transacting more than the limit without submitting additional information (i.e., datapoints).

In some embodiments, the transaction kiosk that a user is interacting with can be grouped into a kiosk group, with a particular group risk level and group transaction limit applied to the transaction kiosks placed within that group. Such group transaction limits and group risk levels can be assigned to specific transaction kiosks which, for example, bear a higher risk of non-compliant activity. These groupings would thus enable the system to require additional datapoint collection from the kiosks placed within the groups. Kiosks may be placed into groups based on any arbitrary criteria or reasoning. For example, kiosks may be grouped together because they share a particular geographic boundary that is deemed to have higher risk of non-compliant activity.

In some embodiments, the system receives a label for the transaction kiosk from one or more authorized users. The label can be a labeling or tagging of the kiosk according to any arbitrary system of labeling. Based on the label, the system associates the transaction kiosk with a kiosk group, with transaction kiosks within that group all sharing the same label. The kiosk group is associated with a particular group risk level and group transaction limit. When a transaction is being initiated, the system then applies the group transaction limit to that transaction at the transaction kiosk, rather than the previous transaction limit assigned to the user. However, in some embodiments, if a stricter transaction limit applies to the user, or more documents are required for verification purposes, then the system may select the stricter transaction limit rather than the group transaction limit for that transaction. As a result of the group risk level and transaction limit, there may also be additional verification documents required that a transaction otherwise wouldn't have required.

In some embodiments, kiosks may be grouped because they are located within some geographic boundary. In other embodiments, the grouping may not be based on geography at all. For example, the grouping of kiosks could be based on a type of venue (e.g., inside a casino), or may be based on socio-economic statistics of that location. Any arbitrary reason for grouping may be applied.

In some embodiments, they may be options for a developer of the system to designate kiosks within such groups on the backend of the system. In some embodiments, there may be a UI elements or components which allow kiosk owners, financial institutions, or authorized users to designate their own kiosks within certain groupings.

At step 206, the system detects a transaction attempt of the user which exceeds the transaction limit of the transaction level for the user. The system may detect such a transaction attempt in any of a wide variety of ways. For example, if a user is associated with a first transaction level with a $1000 transaction limit, then if the user attempts to initiate a transaction involving $1500, the system detects that a transaction attempt was made by the user which exceeds the transaction limit. In some embodiments, the system may analyze the existing compliance documents and/or datapoints which are located in the system and associated with the user, and may detect that the existing documents/datapoints are not enough to execute the transaction because they exceed the transaction limits set for that transaction level.

In some embodiments, rather than a transaction attempt by the user, the user selects a higher transaction level than their current existing transaction level within the transaction interface. In some embodiments, the higher transaction level can be denoted or explained in any of a variety of ways, such as, e.g., a risk level, "score", or any other suitable fashion.

At step 208, the system determines a location of the user and a financial institution or other service provider associated with the transaction kiosk. In some embodiments, the system determines the location of the user based on which transaction kiosk the user is currently using. In some embodiments, the location includes at least a country and a jurisdiction (e.g., state or other such region within the country) the user is located in. Each kiosk is associated with a particular location, and this location can thus be associated with the user's current location. In some embodiments, the kiosk may be associated with its physical location, with the location of the financial institution and/or other service provider associated with the kiosk, or may be tied to some other location. In some embodiments, the system is capable of automatically detecting or retrieving the associated service provider for the transaction kiosk. In some embodiments where multiple service providers or financial providers are associated with a kiosk, the system may determine which of the financial institutions the user is currently interacting with via the user interface.

At step 210, the system sends a prompt to the user at the transaction interface to provide one or more required datapoints for a higher transaction level. The higher transaction level relates to a predefined range of transaction amounts that the user is attempting to transact within. In some embodiments, the required datapoints are based at least on the location of the user, the financial institution associated with the transaction kiosk, and the amount of the transaction attempt. In some embodiments, the prompt includes information regarding a compliance requirement for the user to provide one or more documents in order to transact with the amount of money the user wishes to transact with, based on the transaction attempt. In some embodiments, the prompt includes information about, e.g., the transaction level of the user, the transaction limit associated with the transaction level of the user, or other pieces of information. In other embodiments, some or all of this information may be omitted. This may be done in situations where, for example, too much transparency with respect to transaction levels and/or limits being displayed can lead to organized attempts to circumvent transaction limits. "Smurfing", for example, involves a number of small value user accounts initiates small value transactions in order to exceed a transaction limit in an organized way. The likelihood of such attempts to circumvent the system occurring may lead some service providers to not exposed such information to users.

In some embodiments, the required datapoints are documents which are required to be submitted in order for a financial institution or entity to meet compliance requirements. Compliance requirements may be either internal or external requirements and/or policies. For example, financial institutions are subject to financial regulations which must be complied with in order to avoid often severe repercussions. Examples of regulations include the Bank Secrecy Act (BSA) within the United States, Bit License within the specific U.S. state of New York, and the Proceeds of Crime, Money Laundering, and Terrorist Financing Act (PCMLTFA) in Canada. Different locations and/or jurisdictions may require different specific forms of identification, proof of address, or other data. Different users will thus have different required datapoints which are to be submitted, based on which location and jurisdiction they are physically present in, domiciled within, transacting within, or otherwise availing themselves of.

In some embodiments, the user interface is configured to change depending on which such requirements are needed. In some embodiments, the user interface that is displayed will vary according to the user, location, financial institution, or some combination thereof. In some embodiments, a specific user interface scheme is tied to a user. Upon the user determination location and financial institution in step 208, the system updates the user interface to reflect the specific transaction requirements and compliance requirements to be displayed and presented to a user.

At step 212, the system receives the one or more required datapoints. In some embodiments, the user interface may include one or more components for sending the required datapoints. For example, "upload" or "submit" components may be presented. The method of uploading or submitting required datapoints differs depending on the specific datapoints which are to be uploaded or submitted. For example, if a photo of the user is to be taken, there may be a camera present or built into the kiosk itself, with the camera being configured to take one or more photos of the user. If a copy of a passport page is required, there may be an interface to scan the passport page directly on the kiosk.

In some embodiments, the user will be able to upload or submit documents via a client device instead, such as, e.g. a smartphone, tablet, or laptop. In some embodiments, the kiosk can navigate the user to such functionality on a client device. For example, the kiosk can direct a user to a specific website, direct the user to scan a QR code, send an SMS or other text message to the user, direct the user to download an application, or similar. In some embodiments, the user can submit documents via their client device during the session at the kiosk, or optionally, the user can asynchronously upload or submit required documents at a later time, away from the kiosk. The user can also potentially submit required documents at a later, second session at the kiosk. Many such possibilities and arrangements can be contemplated.

In some embodiments, the system can perform asynchronous verification of the datapoints after the transaction kiosk session has ended for the user. If the asynchronous verification fails, the user can be directed to a website to complete verification, or some other routing can be established to redirect the user.

In some embodiments, at least one of the required datapoints is captured facial data via facial recognition software within the transaction kiosk. Upon take a photograph of the user with a built-in camera, the captured facial data is then compared to one or more additional datapoints including facial data of the user. In some embodiments, adding the captured facial data to a facial recognition dataset of the customer can be used for future compliance determinations of the user. In this way, the required datapoint of the captured and recognized facial data can be used for compliance determinations needed by the kiosk, by the client device, and/or by the financial institution in other contexts.

In some embodiments, at least one of the required datapoints is a set of cryptocurrency addresses the customer has submitted at the kiosk during a transaction attempt. The addresses further include generating a compliance message which satisfies the regulatory requirements of one or more compliance policies applicable to the location. In some embodiments, this compliance message can then be broadcast to a blockchain network, where the blockchain network is configured to communicate compliance messages between financial institutions.

In some embodiments, the system receives the required datapoint(s), then stores these datapoints as bits in a bitmask associated with the user. The bits of the bitmask all relate to collected datapoints on the user. The higher transaction level can then be determined based on one or more AND or OR operations on the bitmask which are associated with the customer. One example of a bitmask will be described in FIG. 5A in further detail below.

At step 214, the system associates the user with the higher transaction level. In some embodiments, the system processes the received datapoints in a number of potentially different ways. For some datapoints, no verification may be necessary, in which case the system need not analyze or verify the document, and merely the receipt of the document satisfies that particular requirement. In some cases, the document is to be authenticated in some way. For example, the kiosk or client device may submit the document to some authentication process, which may involve sending the document to an authentication server or other location, or authenticating the document locally on the kiosk or client device itself. In some embodiments, each required datapoint includes one or more pieces of metadata for handling processing, authentication, and/or verification of the datapoint in question.

In some embodiments, the client device and/or kiosk are configured to send a notification to the client device that the user has been approved for the higher transaction level. The notification may be, e.g., an on-screen displayed notification window, a push notification, an alert, or any other sort of suitable notification.

In some embodiments, a dashboard or similar interface can be displayed for one or more additional client devices, such as, e.g., for one or more agents associated with the financial institution at the transaction kiosk. The dashboard interface may include information on at least the transaction levels and received datapoints of users at the transaction kiosk.

Upon the higher transaction level being assigned to the user, the system may, either automatically or upon the user's approval, execute the transaction attempt based on the higher transaction level. The system may execute the transaction attempt in any suitable way that the particular kiosk operates to execute transactions. For example, in the case of a blockchain-based currency, the kiosk may attempt to verify the transaction on a blockchain network before recording the transaction on the blockchain.

Figure 2B:
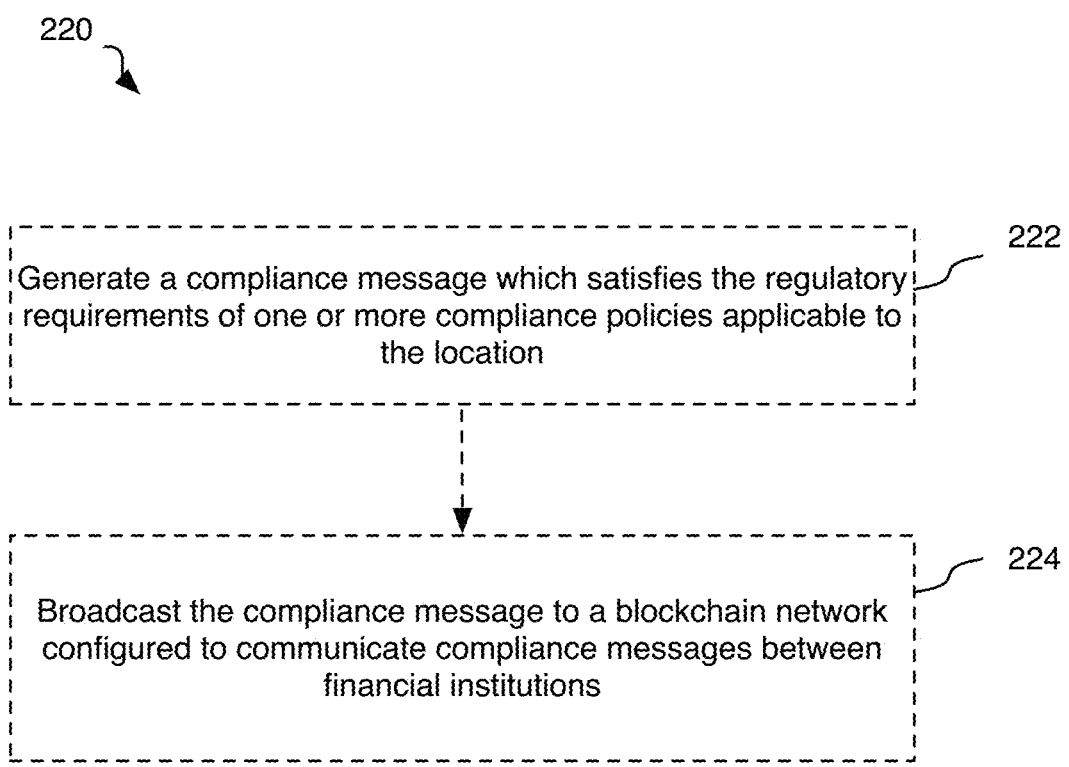
FIG. 2B is a flow chart illustrating additional steps that may be performed in accordance with some embodiments.

FIG. 2B is a flow chart illustrating additional steps that may be performed in accordance with some embodiments.

At optional step 222, the system generates a compliance message which satisfies the regulatory requirements of one or more compliance policies applicable to the location. The one or more compliance policies may be any compliance policy which may be codified, either internally to a financial provider or other service provider, or externally in the form of externally imposed legal and financial regulations. In some embodiments, a list or texts of such policies may be retrievable from a database for a particular kiosk, financial institution, user, or otherwise. In some embodiments, the compliance message is a message which can be readable and understood by other financial institutions, e.g., within a specific format for manual or automated authentication purposes. Compliance messages may be sent from financial institutions to other financial institutions, from financial institutions to regulatory bodies, or any other suitable destination.

One example involves one of the required datapoints for a transaction level being a blockchain-based piece of identification, such as a blockchain address. The system uses the available datapoints for the customer together to create a compliance message which can be submitted to a messaging system with many financial institutions, in order to comply with a specific imposed travel rule requirement. Such a requirement is imposed for all financial institutions, and to all fiat as well as cryptocurrencies.

At optional step 224, the system broadcasts the compliance message to a blockchain network configured to communicate compliance messages between financial institutions. In some embodiments, one or more mechanisms are configured to allow compliance messages to be broadcast to a blockchain network for the purposes of communicating compliance to financial institutions, regulatory bodies or other suitable destinations.

FIG. 3A is a figure illustrating an example of a user interface prompting a user to select a compliance level, in accordance with some embodiments. In some embodiments, upon the system determining the location of the user or kiosk and financial institution associated with the kiosk, as in step 208 of FIG. 2A, the system associates a particular user interface scheme with the user which is tied to that location and/or financial institution. The system then updates the user interface for the user as it is displayed at the kiosk. In some embodiments, the user interface may update to allow the user to select the level required by the user for their transaction. For example, as shown in the illustration, a transaction amount of up to 1,000 USD per day requires submittal of ID documents; a transaction amount of up to 2,000 USD per day requires submittal of an address and identification documents, and so on, up through the high end of up to 10,000 USD per day, which requires address, occupation, social security number, ID documents, and manual review.

Figure 3B:
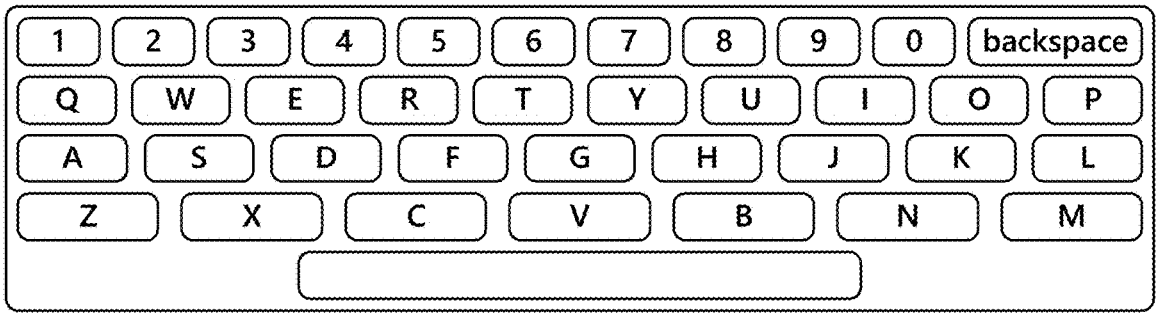
FIG. 3B is a figure illustrating an example of a user interface prompting a user to enter a current address, in accordance with some embodiments.

FIG. 3B is a figure illustrating an example of a user interface prompting a user to enter a current address, in accordance with some embodiments. If the user with the user interface in FIG. 3A decides to navigate to the "up to 2,000 USD a day" option, then the user will be required to submit required datapoints in the form of an address. In this example, no proof or verification of address is necessary. The user need only self-report their address and then select to proceed, and the requirement is satisfied.

Figure 3C:
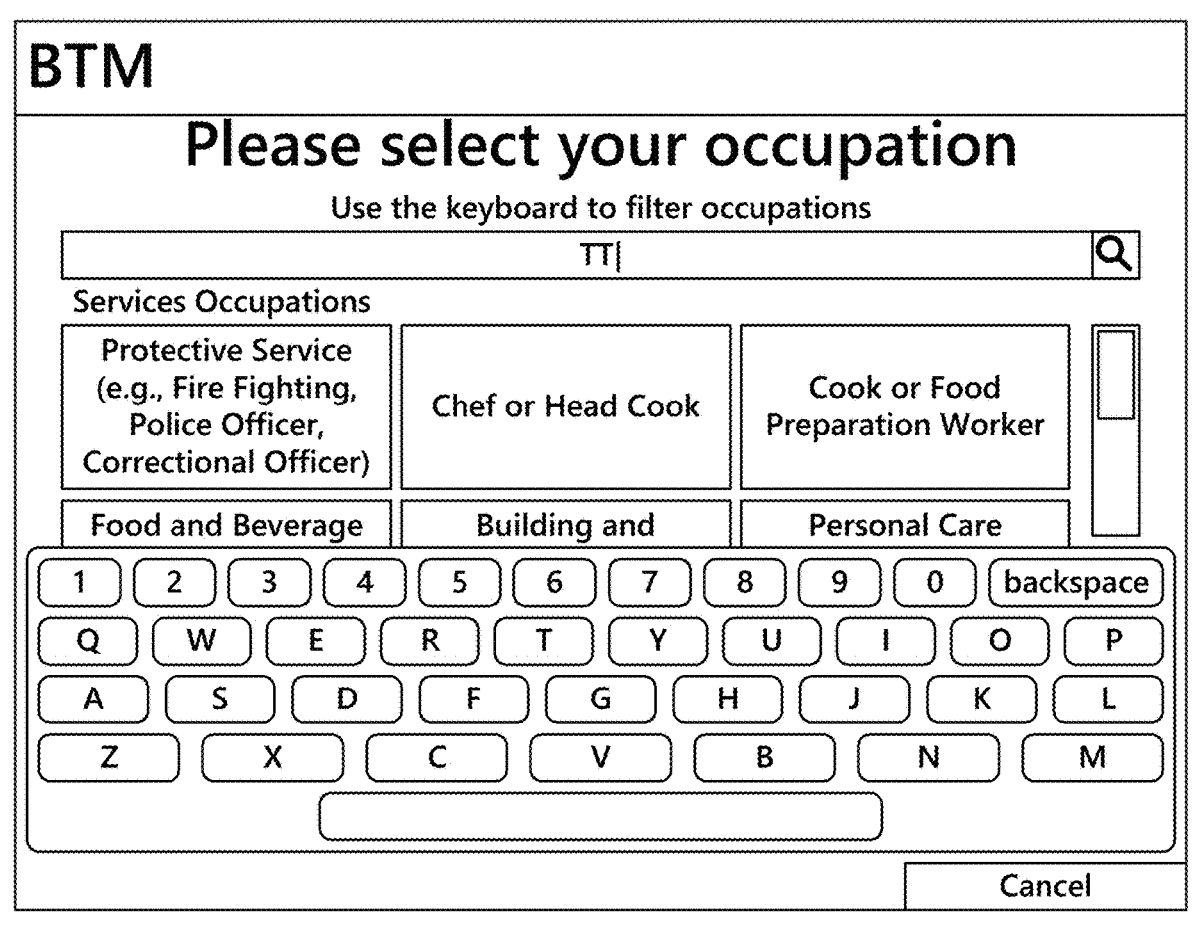

FIG. 3C is a figure illustrating an example of a user interface prompting a user to enter an occupation, in accordance with some embodiments. Similarly to FIG. 3B, the user interface displays a prompt for the user to select their occupation. The user can either type in the occupation of choice, or select it from a menu which can be drilled down into some more specifics.

FIG. 3D is a figure illustrating an example of a user interface prompting a user to enter a social security number, in accordance with some embodiments. As in FIGS. 3B and 3C, the user is promoted to enter his social security number ("SSN"). In this example, the SSN will be submitted for verification through a social security verification process. Some extra steps for encryption and/or confidentiality are also taken to ensure the user's private, sensitive information is handled securely.

FIG. 5A is a figure illustrating an example of proposed bitmask flags for a compliance system, in accordance with some embodiments. In some embodiments, a required datapoint may be assigned to a bit in an arbitrarily long byte. For example, an unsigned 64-bit byte may be utilized (i.e., 64 bits are present in the byte). Every datapoint collected about a user can have a bit assigned to it. For example, bits may be assigned to Voiceover IP (VOIP) number, prepaid number, mobile number, name, identification scanning, facial recognition matching, social security number, sanctions screening, and more.

For any given customer, a specific bitmask can be utilized to define precisely how much is known about a customer from a datapoint level of knowledge. Via the bitmask, this knowledge can be stored in a single numerical reference. The reference may be considered a "score" or other quantification. Transaction levels can then be assigned based on this quantification. For example, a system may not allow a user to transact at a particular transaction limit unless there is bitmask-based knowledge that certain specific bits (i.e., datapoints) are true. This may be bits flagged as, for example, 5, 7, and 11 of the illustrated example (i.e., provided name, identification scanning, and social security number). To determine whether the user in question can be assigned to the higher transaction level, the system can perform a simple AND of the user's bitmask and the transaction level. If the user's bitmask equals the transaction level's bitmask, the user passes; if not, the user fails, and the user will not be able to access that transaction level.

In some embodiments, the system can then perform an OR to determine which datapoints are missing from that user for them to obtain a level, so the system can then prompt that user just for the bits (i.e., datapoints) which are missing. The system thus needs only prompt a user for specific datapoints based on the particular bits which are missing in order to assign a higher transaction level. This allows user interfaces for kiosks to be dynamically generated based on compliance settings and bitmasks. In some embodiments, the system may disclose what is needed to submit to reach a certain transaction limit, while in others, such disclosure is omitted.

Figure 5B:
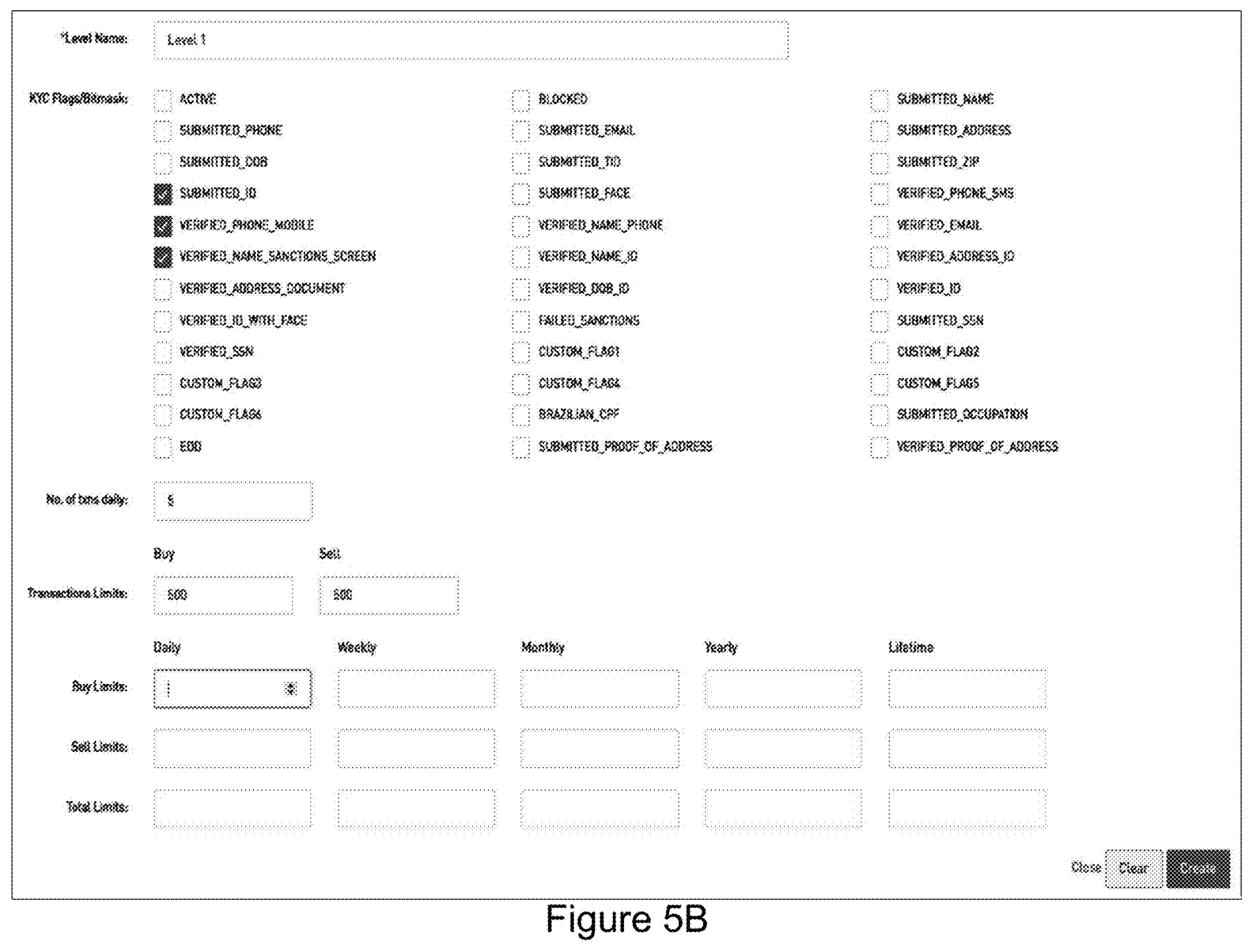

FIG. 5B is a figure illustrating an example of a financial institution creating a compliance level within a compliance system, in accordance with some embodiments. In some embodiments, financial institutions and other service providers may be allowed to generate compliance levels with specific limits and attributes, on a custom basis. In the illustrated example, an interface is shown providing an agent of a financial institution with the ability to check specific KYC flags for a bitmask. The agent has selected submitted ID, verified mobile phone number, and verified name sanctions screen. Thus, all elements are to be met for the user to be assigned this transaction level. Transaction limits of 500 for buy and 500 for sell are also established on a custom basis.

Figure 5C:
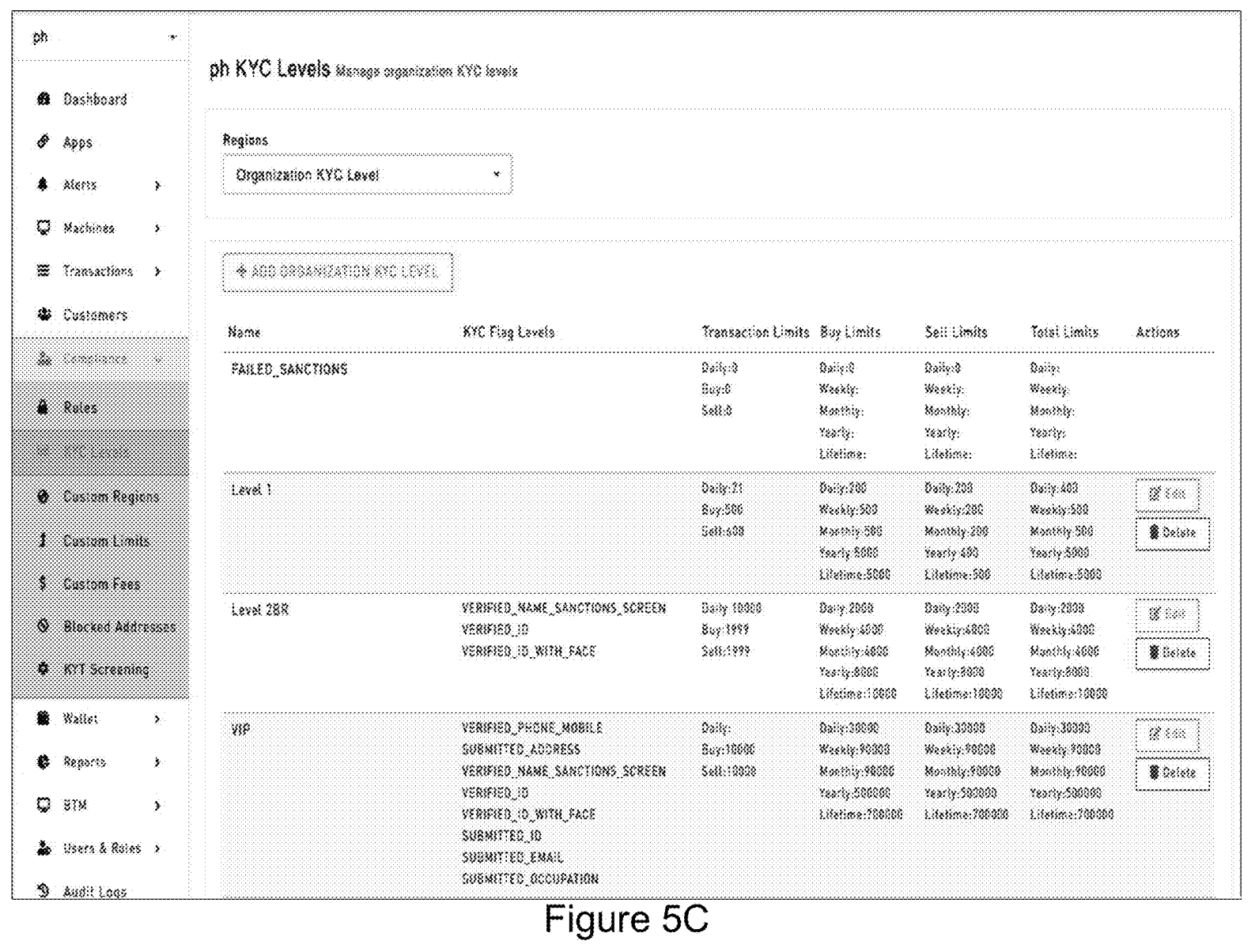

FIG. 5C is a figure illustrating an example of compliance levels within a compliance system, in accordance with some embodiments. Such a user interface exposes a dashboard allowing a user or agent to see specific compliance level settings which have been established for a financial institution or other service provider. This may be seen in a system which allows custom transaction limits. In some embodiments, such custom transaction limits may be possible on a per-customer basis, which requires compliance-based custom transaction limits. In some embodiments, the agent may be provided with one or more ways to override the rules for obtaining higher transaction limits in various situations. Thus, in some embodiments, overrides may be enabled on a per-customer basis.

In some embodiments, one or more "failed sanctions" may be possible which may present negative consequences for the user. In some cases, a failed sanctions represents that the user's name has failed a name sanctions screen. For example, a government may release a list of names that financial institutions are prohibited from transacting with, and any failing to comply are subject to sanctions. If a user's name falls under this, a specific category is required to segregate such users and provide them with no transaction abilities. Within a bitmask, bits may serve a blocking function, such that an AND of a blocking list would result in a complete block, i.e., a "blocking level" rather than a transaction level. This would result in a forced denial of transaction services to the user in question.

Figure 5D:
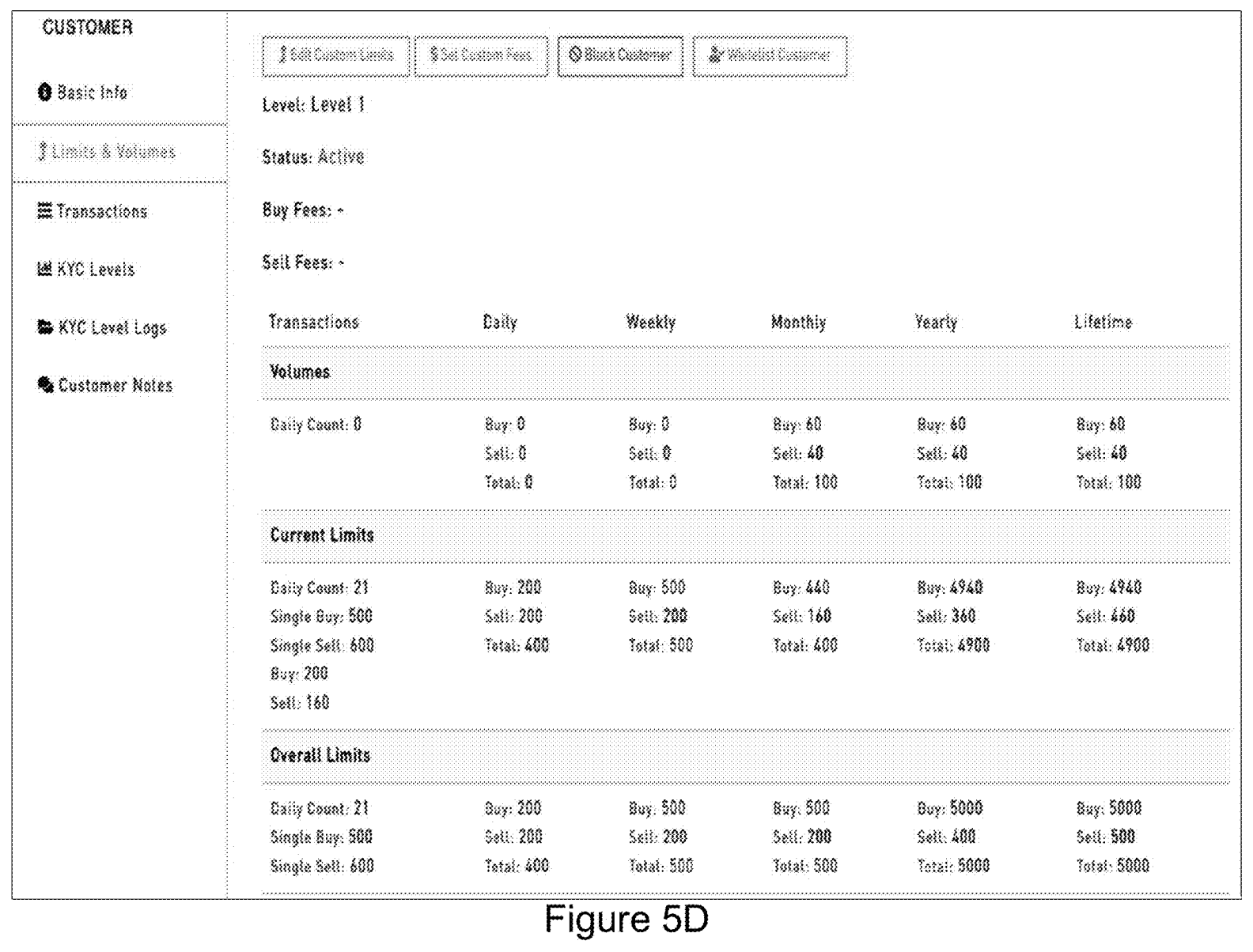

FIG. 5D is a figure illustrating an example of a user profile within a compliance system, in accordance with some embodiments. In some embodiments, a user may be able to view a user profile interface, with various pieces of information exposed relating to current transaction level, transaction limits, and more. In this view, the user can see what their current limits and volumes are.

Figure 6:
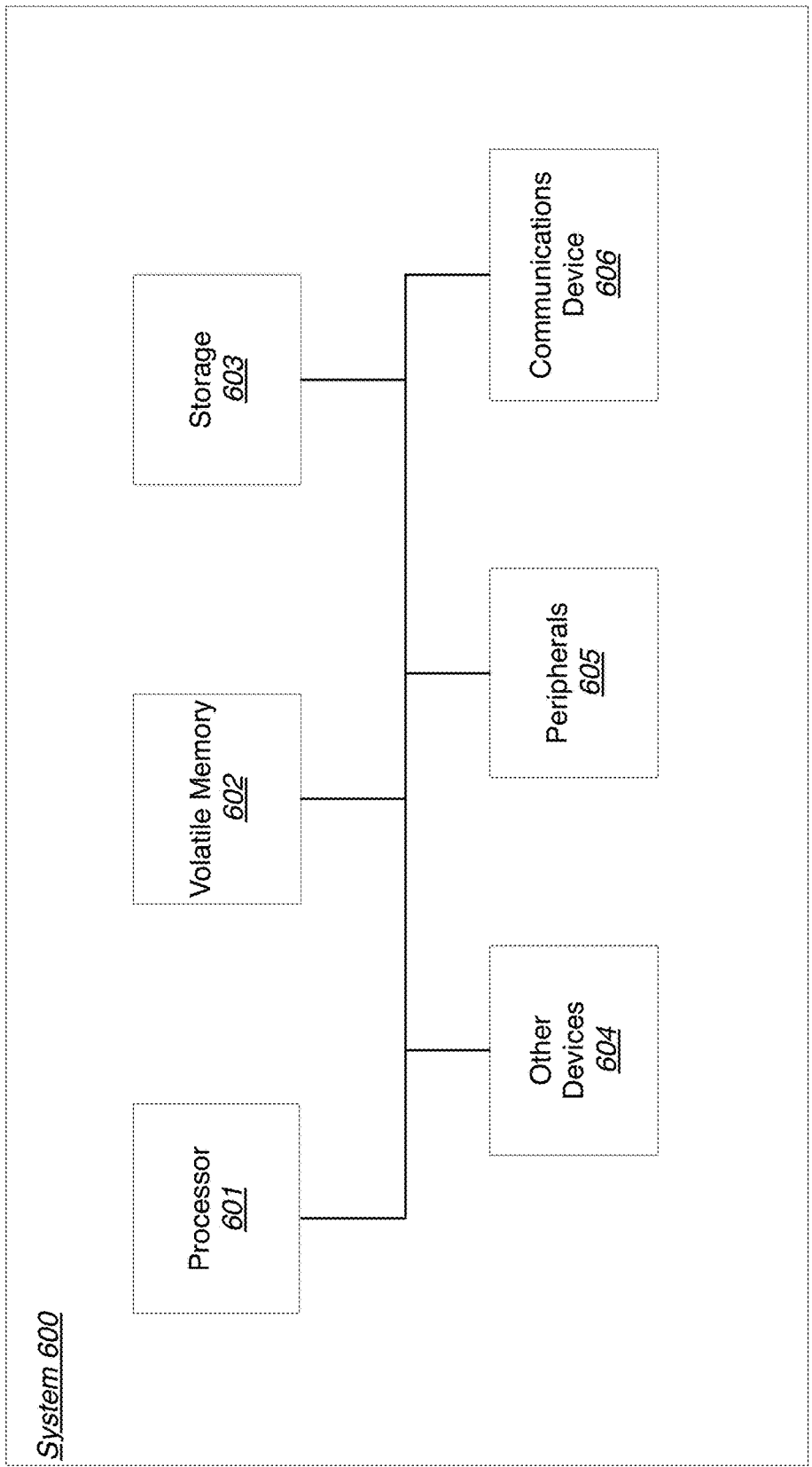
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as, e.g., hard drives, solid state drives, or flash drives. Communications device 606 may connect the computer 100 to an external medium. For example, communications device 606 may take the form of a network adapter that provides communications to a network. A computer 600 may also include a variety of other devices 604. The various components of the computer 600 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for executing a transaction to dispense or accept currency by a network-enabled Automated Teller Machine (ATM) configured to facilitate cryptocurrency transactions for users, the method comprising:
   providing, at a display at the ATM, a transaction user interface;
   authenticating a user of the ATM via the transaction user interface;
   determining an approved transaction level for the user by querying a database remote from the ATM, wherein the database stores remotely configurable transaction levels based on personal datapoints, the transaction level comprising a transaction limit based on a risk level of the ATM and one or more required personal datapoints of the user for compliance of the transaction level, wherein the risk level of the ATM is based on a location of the network-enabled transaction kiosk ATM and is obtained by the ATM from the database remote from the ATM;
   detecting a transaction attempt of the user involving the ATM, wherein the transaction attempt exceeds the transaction limit of the transaction level for the user;
   in response to detecting that the transaction attempt that exceeds the transaction limit, sending a prompt to the transaction user interface of the ATM to prompt the user to provide one or more additional required personal datapoints of the user to enable a higher transaction level based at least on the risk level of the ATM and an amount of the transaction attempt, wherein the prompt is generated by the ATM based on the risk level of the ATM as obtained from the database remote from the ATM; and
   receiving the one or more additional required personal datapoints, associating the user with the higher transaction level, updating the database remote from the ATM with the higher transaction level for the user, and controlling a mechanism of the ATM to dispense or accept currency to execute the transaction attempt at the higher transaction level.

2. The method of claim 1, further comprising:
   receiving a label for the ATM from one or more authorized users;
   based on the label, associating the ATM with an ATM group comprised of a plurality of ATMs with the same label, wherein the ATM group is associated with a group risk level and group transaction limit; and
   applying the group transaction limit to a transaction at the ATM.

3. The method of claim 1, wherein the transaction level for the user is selected based on user information which is at least partly determined from one or more datapoints associated with the user.

4. The method of claim 1, wherein the prompt is sent to a client device associated with the user, wherein the one or more additional required personal datapoints are received from the client device at a later time than the transaction with the ATM, and further comprising:
sending a notification to the client device that the user has been approved for the higher transaction level.

5. The method of claim 1, further comprising:
determining one or more compliance policies based at least the location and a financial institution associated with the ATM,
wherein the higher transaction level is determined based on at least the one or more determined compliance policies.

6. The method of claim 1, further comprising:
storing the one or more additional required personal datapoints received from the user as bits in a bitmask associated with the user, wherein the bits of the bitmask all relate to collected datapoints on the user, and
wherein the higher transaction level is determined based on one or more AND or OR operations on the bitmask associated with the user.

7. The method of claim 1, further comprising:
updating the transaction user interface to display customized information for the user based on at least the approved transaction level, location of the user, and financial institution associated with the ATM.

8. The method of claim 1, wherein at least one of the additional required personal datapoints is captured facial data via facial recognition software within the ATM, and wherein the captured facial data is compared to facial data of the user.

9. The method of claim 8, further comprising:
adding the captured facial data to a facial recognition dataset of the user, wherein the facial recognition dataset of the user can be used for future compliance determinations of the user.

10. The method of claim 1, wherein at least one of the additional required personal datapoints is a set of cryptocurrency addresses the user has submitted at the ATM during a transaction attempt, and further comprising:
generating a compliance message which satisfies regulatory requirements of one or more compliance policies applicable to the location.

11. The method of claim 10, further comprising:
broadcasting the compliance message to a blockchain network, wherein the blockchain network is configured to communicate compliance messages between financial institutions.

12. The method of claim 1, wherein the higher transaction level is selected by the user from one or more options within the transaction user interface.

13. The method of claim 1, further comprising:
upon receiving the one or more additional required personal datapoints, performing asynchronous verification of the one or more additional required personal datapoints after the transaction has ended for the user.

14. The method of claim 13, wherein upon the asynchronous verification failing, the user is directed to a website to complete verification.

15. The method of claim 1, further comprising:
providing, for display on one or more additional client devices, a dashboard interface for one or more agents of a financial institution associated with the ATM, wherein the dashboard interface comprises information on at least the transaction levels and received datapoints of users at the ATM.

16. The method of claim 1, further comprising:
executing the transaction attempt based on the higher transaction level associated with the user.

17. A non-transitory computer-readable medium containing instructions that, when executed by a processor of a ATM, cause the processor to:
provide, for display at the ATM, a transaction user interface for a user;
authenticate a user of the ATM via the transaction user interface;
determine an approved transaction level for the user by querying a database remote from the ATM, wherein the database stores remotely configurable transaction levels based on personal datapoints, the transaction level comprising a transaction limit based a risk level of the ATM and on one or more required personal datapoints of the user for compliance of the transaction level, wherein the risk level of the ATM is based on a location of the ATM and is obtained by the ATM from the database remote from the ATM;
detect a transaction attempt of the user involving the ATM, wherein the transaction attempt exceeds the transaction limit of the transaction level for the user;
send, in response to detecting that the transaction attempt that exceeds the transaction limit, a prompt to the transaction user interface of the ATM to prompt the user to provide one or more additional required personal datapoints of the user to enable a higher transaction level based at least on the risk level of the ATM and an amount of the transaction attempt, wherein the prompt is generated by the ATM based on the risk level of the ATM as obtained from a database remote from the ATM; and
receive the one or more additional required personal datapoints;
associate the user with the higher transaction level, update the database remote from the ATM with the higher transaction level for the user, and control a mechanism of the ATM to dispense or accept currency to execute the transaction attempt at the higher transaction level.

18. The non-transitory computer-readable medium of claim 17, wherein at least one of the additional required personal datapoints is a set of cryptocurrency addresses the user has submitted at the ATM during a transaction attempt, and further comprising instructions that:
generate a compliance message which satisfies regulatory requirements of one or more compliance policies applicable to the location.

19. The method of claim 1, wherein the one or more additional required personal datapoints comprises additional verification documents that are only required for the transaction attempt because of the risk level.

* * * * *